(12) United States Patent
Fukudome

(10) Patent No.: US 10,112,480 B2
(45) Date of Patent: Oct. 30, 2018

(54) IN-WHEEL MOTOR UNIT

(71) Applicant: TOYOTA JIDOSHA KABUSHIKI KAISHA, Toyota-shi, Aichi-ken (JP)

(72) Inventor: Hideki Fukudome, Toyota (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 0 days.

(21) Appl. No.: 15/792,133

(22) Filed: Oct. 24, 2017

(65) Prior Publication Data

US 2018/0272865 A1    Sep. 27, 2018

(30) Foreign Application Priority Data

Mar. 21, 2017    (JP) .................................. 2017-054219

(51) Int. Cl.
| | | |
|---|---|---|
| B60K 17/14 | (2006.01) | |
| B60K 7/00 | (2006.01) | |
| B60B 27/00 | (2006.01) | |
| B60B 27/04 | (2006.01) | |
| B60K 17/04 | (2006.01) | |

(52) U.S. Cl.
CPC .......... *B60K 17/14* (2013.01); *B60B 27/0052* (2013.01); *B60B 27/0073* (2013.01); *B60B 27/04* (2013.01); *B60K 7/0007* (2013.01); *B60K 17/043* (2013.01)

(58) Field of Classification Search
CPC .... B60K 17/14; B60K 17/043; B60K 7/0007; B60B 27/0052; B60B 27/0073; B60B 27/04

USPC ...................................................... 180/65.51
See application file for complete search history.

(56) References Cited

U.S. PATENT DOCUMENTS

| | | | | |
|---|---|---|---|---|
| 3,566,165 A | * | 2/1971 | Lohr ..................... | B60K 7/0007 310/67 R |
| 4,179,016 A | * | 12/1979 | Alderman ............ | B60K 17/043 188/71.4 |
| 4,536,668 A | * | 8/1985 | Boyer ................... | B60C 23/041 180/65.51 |
| 5,087,229 A | * | 2/1992 | Hewko ................ | B60K 7/0007 180/65.51 |

(Continued)

FOREIGN PATENT DOCUMENTS

| | | |
|---|---|---|
| JP | 2007-331661 A | 12/2007 |
| JP | 2012-140100 A | 7/2012 |
| JP | 2016-073061 A | 5/2016 |

*Primary Examiner* — James A Shriver, II
*Assistant Examiner* — Brian L Cassidy
(74) *Attorney, Agent, or Firm* — Sughrue Mion, PLLC

(57) ABSTRACT

An in-wheel motor unit comprises a housing, a motor, a speed reducer, a hub bearing comprising an inner race and an outer race, and a seal member fluid-tightly sealing a gap between the housing and the outer race. The outer race comprises a cylinder part disposed inside the housing and a flange part fixed to a housing wall surface by one or a plurality of fastening members. The housing has a projecting part with a substantially cylindrical shape extending from a housing opening in an axle inward direction. An outer peripheral surface of the cylinder part abuts against an inner peripheral surface of the projecting part. The seal member is disposed in a groove provided on the outer peripheral surface and extending over a whole periphery of the cylinder part of the outer race.

2 Claims, 5 Drawing Sheets

(56) References Cited

U.S. PATENT DOCUMENTS

| | | | | |
|---|---|---|---|---|
| 6,100,615 | A * | 8/2000 | Birkestrand | B62K 23/04 180/65.51 |
| 8,720,622 | B2 * | 5/2014 | Ito | B62M 6/65 180/65.51 |
| 8,863,885 | B2 * | 10/2014 | Dagh | B60K 7/0015 180/308 |
| 8,950,531 | B2 * | 2/2015 | Urabe | B62M 6/65 180/205.1 |
| 8,961,361 | B2 * | 2/2015 | Ishizuka | B60K 17/046 180/184 |
| 2003/0155161 | A1 * | 8/2003 | Dorski | B60K 7/0007 180/65.51 |
| 2008/0035399 | A1 * | 2/2008 | Murata | B60K 7/0007 180/65.51 |
| 2008/0035407 | A1 * | 2/2008 | Murata | B60K 7/0015 180/308 |
| 2008/0070736 | A1 * | 3/2008 | Yoshino | B60K 7/0007 475/149 |
| 2009/0312134 | A1 * | 12/2009 | Schoon | H02K 7/1025 475/154 |
| 2012/0025644 | A1 * | 2/2012 | Ogawa | B60K 7/0007 310/83 |
| 2014/0028081 | A1 * | 1/2014 | Han | B60K 17/043 301/6.5 |
| 2014/0353056 | A1 * | 12/2014 | Hirano | B60K 7/0007 180/65.51 |
| 2015/0003765 | A1 * | 1/2015 | Inoue | F16D 65/12 384/477 |
| 2016/0238105 | A1 * | 8/2016 | Moore | F16H 1/10 |
| 2016/0355084 | A1 * | 12/2016 | Uozumi | H02K 1/30 |
| 2016/0361988 | A1 * | 12/2016 | Bolt | B60K 7/0007 |
| 2018/0056775 | A1 * | 3/2018 | Fukudome | B60K 7/0007 |
| 2018/0118022 | A1 * | 5/2018 | Shin | B60K 17/046 |

* cited by examiner

IN-WHEEL MOTOR UNIT

TECHNICAL FIELD

The present invention relates to an in-wheel motor unit configured to drive a wheel by a motor disposed inside the wheel.

BACKGROUND ART

An in-wheel motor unit (a wheel driving apparatus) configured to drive a wheel by a motor disposed inside the wheel has conventionally been known as one form of an electric automobile (refer Japanese Patent Application Laid-Open (kokai) No. 2016-073061.).

This in-wheel motor unit comprises the motor and a speed reducer configured to change (increase) torque of the motor to output. The speed reducer includes a rotating body (for example, a counter gear) configured to be rotated by the motor, and an output shaft fixed to the rotating body. The output shaft extends to outside of a housing in an axle direction via an opening of a wall surface of the housing. The output shaft is rotatably supported with respect to the housing by a hub bearing comprising a bearing part and a hub part. When the motor is supplied with electric power, torque of the motor is changed (increased) via the speed reducer, and the changed (increased) torque is transmitted to the wheel fixed to the hub part of the hub bearing, thereby the wheel is rotated. Hereinafter, the in-wheel motor unit will be also simply referred to as a "motor unit".

SUMMARY OF THE INVENTION

It is desired to downsize such a motor unit in the axle direction and in a radial direction (an arbitrary direction perpendicular to the axle direction). Therefore, it can be considered to adopt a configuration where the hub bearing which is usually disposed outside the housing is moved in an axle inward direction so that a part of the hub bearing will be disposed inside the housing. According to this configuration, the motor unit can be downsized in the axle direction.

However, in the aforementioned configuration where "a part of the hub bearing is positioned inside the housing", there is a possibility that the motor unit increases in size in the radial direction by a reason stated below. FIG. 3 shows a schematic diagram of a motor unit 301 having the configuration where "a part of the hub bearing is positioned inside the housing". In this motor unit 301, in order to prevent a lubricating oil for lubricating each member inside a housing 310 from leaking outside the housing 310, a gap between the housing 310 and an outer race 340b of a hub bearing 340 is fluid-tightly sealed by an O-ring 362 disposed at an outer periphery part of an opening 312 of the housing 310.

The outer race 340b is fixed to the housing 310 by fixing a flange part 340b2 thereof onto a wall surface 310a of the housing 310 by bolts 372, 374. In this motor unit 301, the O-ring 362 is disposed at the outer periphery part of the housing opening 312, and thus the bolts 372, 374 are disposed at a further outer periphery side than this O-ring 362. As a result, the bolts 372, 374 are disposed at positions relatively apart from the housing opening 312, which causes bearings 80, 82 supporting a driving shaft 26 of a motor 20 to be disposed at positions further apart from the opening 312 than the bolt 372 in order to avoid an interference with the bolt 372. That is, when the bolt 372 is disposed at a position relatively apart from the opening 312, the bearings 80, 82 and the motor 20 come to be disposed at positions further apart from the opening 312 than the bolt 372, and a result of this, there is a possibility that the motor unit 301 increases in size in the radial direction.

The present invention is made to resolve the problem above, and one of objects of the present invention is to provide, in an in-wheel motor unit where a part of a hub bearing is positioned inside a housing, a technique capable of downsizing the in-wheel motor unit in a radial direction while suppressing an increase in size of the in-wheel motor unit in an axle direction.

An in-wheel motor unit (1) of the present invention comprises;

a housing (10) supported by a vehicle body and disposed inside a wheel of a vehicle;

a motor (20) supported by the housing (10) and accommodated inside the housing (10);

a speed reducer (30) comprising a rotating body (34) configured to be rotated by the motor (20) on an inside of the housing (10) and an output shaft (36) fixed to or integrated with the rotating body (34), penetrating an opening (12) provided on a wall surface (10a) of the housing (10) to extend to outside of the housing (10) in an axle outward direction, and configured to integrally rotate with the wheel;

a hub bearing (40) comprising an inner race (40a) fixed to a part of the output shaft (36) positioned at an axle outward direction side of the rotating body (34) and an outer race (40b) fixed to the housing (10), and rotatably supporting the output shaft (36) with respect to the housing (10); and a seal member (62) fluid-tightly sealing a gap between the housing (10) and the outer race (40b).

In the in-wheel motor unit (1) of the present invention, the inner race (40a) comprises a cylinder part (40a1), a part of which being disposed inside the housing (10) and a flange part (40a2) provided at an end part in the axle outward direction of the cylinder part (40a1), the outer race (40b) comprises a cylinder part (40b1) disposed inside the housing (10) and a flange part (40b2) provided at an end part in the axle outward direction of the cylinder part (40b1), the flange part (40b2) of the outer race (40b) is fixed to the wall surface (10a) of the housing (10) by one or a plurality of fastening members (72, 74), and the flange part (40a2) of the inner race (40a) is fixed to a brake rotor (90) disposed outside the housing (10), the housing (10) has a projecting part (11) with a substantially cylindrical shape extending from the opening (12) in an axle inward direction, an outer peripheral surface (45) of the cylinder part (40b1) of the outer race (40b) abuts against an inner peripheral surface (11a) of the projecting part (11), a part of the outer peripheral surface (45) of the cylinder part (40b1) of the outer race (40b), the part abutting against the inner peripheral surface (11a) of the projecting part (11), includes a groove (46) extending over a whole periphery of the cylinder part (40b1) of the outer race (40b), and the seal member (62) is disposed in the groove (46).

In the in-wheel motor unit of the present invention, a part of the hub bearing is positioned inside the housing via the opening provided on the wall surface of the housing. The flange part of the outer race of the hub bearing is fixed to this wall surface of the housing by one or a plurality of the fastening members. In this in-wheel motor unit, the housing has the projecting part with a substantially cylindrical shape extending from the opening thereof in the axle inward direction. The outer peripheral surface of the cylinder part of the outer race abuts against the inner peripheral surface of the projecting part. A part of the outer peripheral surface of the cylinder part of the outer race, the part abutting against the inner peripheral surface of the projecting part, includes the groove extending over a whole periphery thereof. In other words, at least a part of the outer peripheral surface of the cylinder part of the outer race abuts against the inner peripheral surface of the cylinder part of the projecting part over a whole periphery thereof, and the at least a part includes the aforementioned groove. The seal member is disposed in this groove. This enables the seal member to fluid-tightly seal a gap between the inner peripheral surface of the projecting part and the outer peripheral surface of the cylinder part of the outer race (that is, a gap between the housing ang the outer race).

In an in-wheel motor unit where a part of the hub bearing is positioned inside the housing, it can be considered to dispose a seal member at an outer periphery part of the opening of the housing and thereby to fluid-tightly seal a gap between the wall surface of the housing and the flange part of the outer race (that is, the gap between the housing and the outer race). However, in this configuration, one or a plurality of the fastening members for fixing the outer race (strictly, the flange part of the outer race) to the housing need to be disposed at an outer periphery side of the seal member, and therefore the in-wheel motor unit increases in size in the radial direction (refer to FIG. 3).

According to the present invention, it becomes unnecessary to dispose the seal member for fluid-tightly sealing the gap between the housing and the outer race at the outer periphery part of the opening of the housing, and therefore one or a plurality of the fastening members for fixing the outer race (strictly, the flange part of the outer race) to the housing can be disposed at positions closer to the opening of the housing, and as a result, the in-wheel motor unit can be downsized in the radial direction.

In addition, in the in-wheel motor unit of the present invention, for sealing the gap between the projecting part of the housing and the cylinder part of the outer race, the groove for disposing the seal member is provided on the outer peripheral surface of the cylinder part of the outer race, not on the inner peripheral surface of the projecting part.

Here, in some cases, inclined surfaces are formed by a chamfering process upon a corner part in the axle inward direction of the projecting part (that is, a corner part connecting the inner peripheral surface of the projecting part and a frond end surface in the axle inward direction of the projecting part) and upon a corner part in the axle outward direction of the projecting part (that is, a corner part connecting the inner peripheral surface of the projecting part and the wall surface of the housing). Besides, in general, inclined surfaces are formed by the chamfering process upon corner parts of the groove for disposing the seal member.

FIG. 4 shows a schematic diagram of a motor unit 401 having a configuration where "a groove for disposing the seal member is provided on the inner peripheral surface of the projecting part". In this motor unit 401, a groove 446 extending over a whole periphery of an inner peripheral surface 411a of a projecting part 411 is provided on this inner peripheral surface 411a, and a gap between a housing 410 and an outer race 440b is fluid-tightly sealed by an O-ring 462 disposed in the groove 446. FIG. 5 shows a partially enlarged diagram for the projecting part 411 and a cylinder part 440b1 of the outer race 440b. It should be noted that illustrations of two groups of rolling elements 40c and oil seal members 50, 52 are omitted.

As shown in FIG. 5, an inclined surface 411 is formed by the chamfering process over a whole periphery upon a corner part connecting the inner peripheral surface 411a of the projecting part 411 and a front end surface 411c in the axle inward direction (in a leftward direction in FIG. 5) of the projecting part 411, and an inclined surface 412a is formed by the chamfering process over a whole periphery upon a corner part connecting the inner peripheral surface 411a of the projecting part 411 and a wall surface 411b of the housing 410. In addition, upon corner parts of the groove 446, inclined surfaces 448a and 448b are formed by the chamfering process over whole peripheries. That is, on the inner peripheral surface 411a of the projecting part 411, a total of the four inclined surfaces are formed by the chamfering process.

Therefore, in the motor unit 401, in order to avoid adjacent inclined surfaces (that is, the inclined surface 411b and the inclined surface 448a, and the inclined surface 412a and the inclined surface 448b) from continuing (contacting or interfering) with each other due to a tolerance of the chamfering process, a length in the axle direction of an inner peripheral surface 445 connecting adjacent inclined surfaces is designed to be relatively long. As a result, in the configuration where "the groove for disposing the seal member is provided on the inner peripheral surface of the projecting part" as illustrated in the motor unit 401, although it is possible to downsize a motor unit in the radial direction, the projecting part becomes long in the axle direction, and therefore the motor unit is likely to increase in size in the axle direction (Lr3 (FIG. 4)<Lr2 (FIG. 3), La3 (FIG. 4)>La2 (FIG. 3)).

However, in the present invention, the groove for disposing the seal member is provided on the outer peripheral surface of the cylinder part of the outer race as described above. Therefore, even in a case where the projecting part is chamfered, the inclined surfaces are formed only at the corners in the axle inward direction and in the axle outward direction of the projecting part. Hence, in comparison to the configuration where the groove is provided on the inner peripheral surface of the projecting part, it can be suppressed that the projecting part becomes long in the axle direction, and thus it can be suppressed that the in-wheel motor unit increases in size in the axle direction.

From the above, according to the configuration of the present invention, regarding an in-wheel motor unit where a part of a hub bearing is positioned inside a housing, it can be realized to downsize the in-wheel motor unit in a radial direction while suppressing an increase in size of the in-wheel motor unit in an axle direction.

In one aspect of the in-wheel motor unit (1) of the present invention, the part of the output shaft positioned at the axle outward direction side of the rotating body is rotatably supported with respect to the housing only by the hub bearing.

In a conventional configuration, a bearing was disposed between the rotating body and the hub bearing, and this bearing played a role of "rotatably supporting the output shaft with respect to the housing". However, in the aforementioned configuration, the part of the output shaft positioned at the axle outward direction side of the rotating body is rotatably supported with respect to the housing only by the hub bearing. That is, the hub bearing plays the aforementioned role as well. Therefore, the bearing disposed between the rotating body and the hub bearing becomes unnecessary. Hence, the length in the axle direction can be further shortened by a length of this bearing, and a number of parts can be reduced as a whole.

In the above description, references used in the following descriptions regarding embodiments are added with parentheses to the elements of the present invention, in order to assist in understanding the present invention. However, those references should not be used to limit the scope of the invention.

DESCRIPTION OF THE EMBODIMENT

Embodiment

Figure 1:
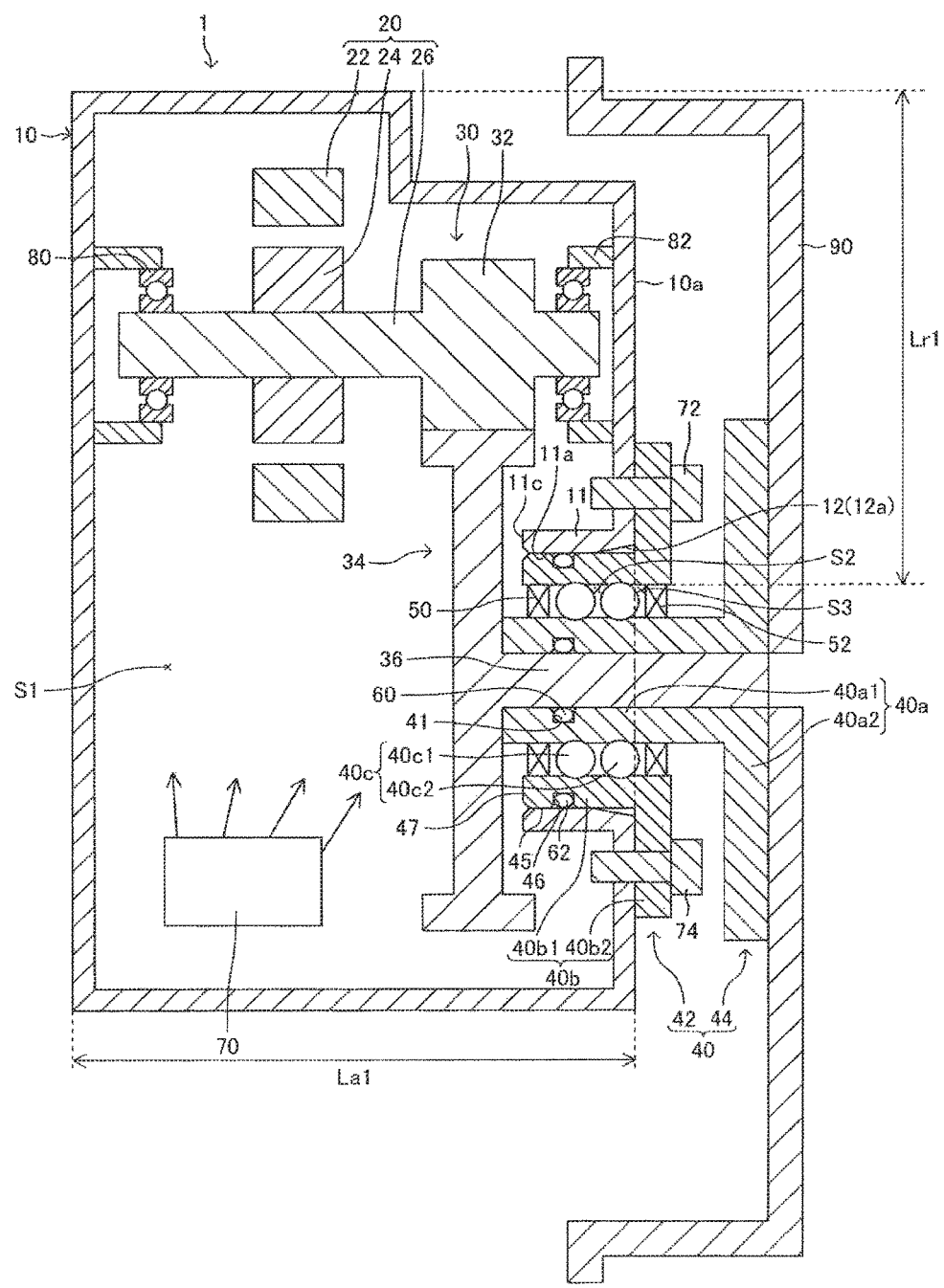
FIG. 1 is a schematic sectional diagram for an in-wheel motor unit according to an embodiment of the present invention when seen from a front-rear direction of a vehicle.

As shown in FIG. 1, an in-wheel motor unit 1 according to an embodiment of the present invention (hereinafter, also simply referred to as a "motor unit 1".) comprises a housing 10, a motor 20, a speed reducer 30, a hub bearing 40, oil seal members 50, 52, O-rings 60, 62, and an oil supply apparatus 70. Note that a rightward direction of each of FIG. 1 to FIG. 5 corresponds to an axle outward direction, and a leftward direction of each of FIG. 1 to FIG. 5 corresponds to an axle inward direction.

The housing 10 is connected to a suspension arm (illustration omitted), and is disposed inside a wheel (illustration omitted) of a vehicle. The housing 10 has a substantially rectangular parallelepiped shape. An opening 12 with a circular shape is provided on a wall surface 10a in the axle outward direction of the housing 10. The housing 10 has a projecting part 11 with a substantially cylindrical shape extending from the opening 12 in the axle inward direction inside the housing 10.

An inclined surface 12a is formed by a chamfering process over a whole periphery upon a corner part connecting an inner peripheral surface 11a of the projecting part 11 and the wall surface 10a of the housing 10. That is, the opening 12 provided on the wall surface 10a reduces in diameter toward the axle inward direction. The inclined surface 12a serves as a guide for inserting a cylinder part 40b1 (mentioned later) of an outer race 40b of the hub bearing 40 into the opening 12. In the present embodiment, the inclined surface 12a is inclined at 30° to the inner peripheral surface 11a of the projecting part 11.

Figure 2:
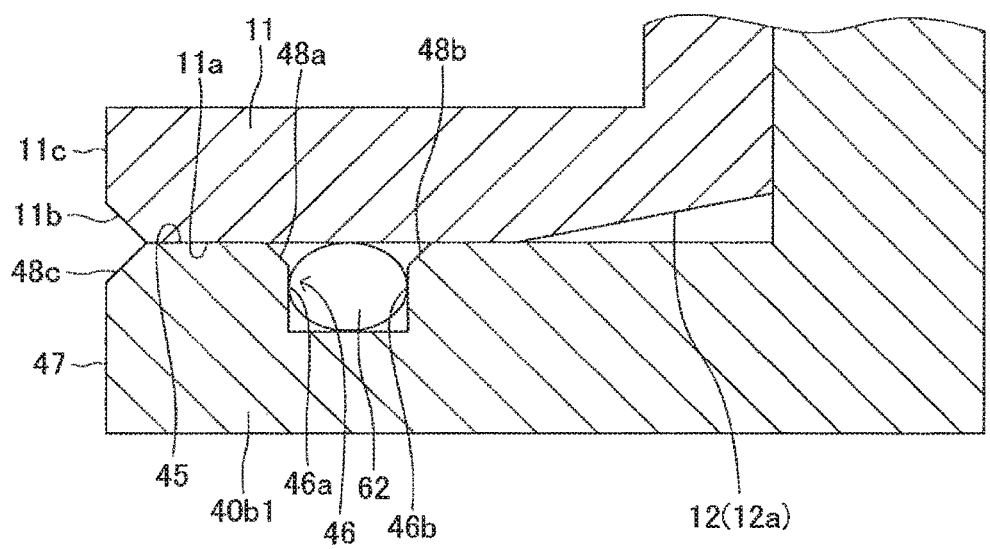
FIG. 2 is a partially enlarged diagram for a projecting part of a housing in FIG. 1 and an outer race of a hub bearing positioned inside the housing.

FIG. 2 is a partially enlarged diagram of the projecting part 11 and the cylinder part 40b1 of the outer race 40b. As shown in FIG. 2, an inclined surface 11b is formed by the chamfering process over a whole periphery upon a corner part connecting the inner peripheral surface 11a of the projecting part 11 and a front end surface 11c in the axle inward direction of the projecting part 11. By forming the inclined surface 11b, it is prevented that the corner part connecting the inner peripheral surface 11a and the front end surface 11c damages each member inside the housing 10. In the present embodiment, the inclined surface 11b is inclined at 45° to the inner peripheral surface 11a of the projecting part 11.

Referring back to FIG. 1, the motor 20 is accommodated inside the housing 10. The motor 20 is a three-phase brushless motor, and includes a stator 22, a rotor 24, and a driving shaft 26. The stator 22 is supplied with electric power from a power source apparatus (illustration omitted) of the vehicle via a motor controlling apparatus (illustration omitted). The stator 22 makes the rotor 24 generate torque with the electric power supplied. The motor 20 rotates the wheel by this torque. That is, the motor 20 functions as an apparatus to generate torque for driving the wheel. In addition, the rotor 24 is rotated by a force acted on the wheel by a road surface. This rotation of the rotor 24 enables the motor 20 to generate electric power. This electric power is supplied to the power source apparatus (that is, this electric power is regenerated) via the motor controlling apparatus. That is, the motor 20 functions also as a generator. The motor 20 is rotated by the motor controlling apparatus in a positively rotating direction as well as in a reverse rotating direction. Hereinafter, a description will be made by defining a rotating direction of the motor 20 in a case when the motor 20 applies torque to the wheel for moving the vehicle forward as the positively rotating direction.

The driving shaft 26 extends in the axle direction (a left-right direction of a vehicle body), and is coaxially arranged with the rotor 24. The driving shaft 26 is fixed to (or integrated with) the rotor 24, and integrally rotates with the rotor 24. The driving shaft 26 is rotatably supported with respect to the housing 10 by ball bearings 80, 82 arranged inside the housing 10. A driving gear 32 (mentioned later) is fixed to (or integrated with) the driving shaft 26 between the rotor 24 and the bearing 82.

The speed reducer 30 includes the driving gear 32, a driven gear 34 as a "rotating body", and an output shaft 36. The driven gear 34 is also referred to as a counter gear. The driving gear 32 is coaxially arranged with the driving shaft 26, and integrally rotates with the driving shaft 26. The driven gear 34 has a larger diameter than the driving gear 32, and rotates by being meshed with the driving gear 32. The driven gear 34 is coaxially arranged with a central axis of rotation of the wheel.

The output shaft 36 extends in the axle direction and is coaxially arranged with the driven gear 34. That is, the output shaft 36 is coaxially arranged with the central axis of rotation of the wheel. One end in the axle inward direction of the output shaft 36 is fixed to (or integrated with) the driven gear 34. Thereby, the output shaft 36 integrally rotates with the driven gear 34. The output shaft 36 penetrates the wall surface 10a via the opening 12 of the housing 10 to extend to outside the housing 10.

The hub bearing 40 is a member formed by integrating a bearing part 42 and a hub part 44 with each other. In other words, the hub bearing 40 includes the bearing part 42 and the hub part 44, wherein the bearing part 42 and the hub part 44 are integrated with each other. The hub bearing 40 includes an inner race 40a, an outer race 40b, two groups of rolling elements (two groups of bearing balls) 40c, and a retainer (illustration omitted). The inner race 40a includes a cylinder part 40a1 and a flange part 40a2.

The bearing part 42 is comprised of the cylinder part 40a1 of the inner race 40a, the outer race 40b, two groups of the rolling elements 40c, and the retainer. The hub part 44 is comprised of the flange part 40a2 of the inner race 40a.

First, a description about the bearing part 42 will be made. The bearing part 42 is a member formed by integrating two bearings with each other. The bearing part 42 has a substantially cylindrical shape, and extends in the axle direction. Specifically, the cylinder part 40a1 of the inner race 40a has a substantially cylindrical shape, and extends in the axle direction. The cylinder part 40a1 is fixed to the output shaft 36 to integrally rotate with the output shaft 36. On an inner peripheral surface of the cylinder part 40a1, a groove 41 extending over a whole periphery of the cylinder part 40a1 is provided. Two inclined surfaces are formed by the chamfering process over whole peripheries upon two corner parts, each of which connecting a side peripheral surface of the groove 41 and the inner peripheral surface of the cylinder part 40a1. The O-ring 60 is disposed in the groove 41 (mentioned later). One end surface in the axle inward direction of the cylinder part 40a1 abuts against the driven gear 34. The cylinder part 40a1 is smaller in diameter than the opening 12 of the housing 10, and penetrates the wall surface 10a via the opening 12. In other words, a part of the cylinder part 40a1 is positioned inside the housing 10. Here, strictly speaking, the "inside of the housing 10" means an inside of the housing 10 in a case of assuming the opening 12 to be covered with a plane (shown by a two dot line in FIG. 1) including the wall surface 10a (hereinafter, this plane is also referred to as a "virtual plane".). It should be noted that the cylinder part 40a1 may be integrated with the output shaft 36.

The outer race 40b includes the cylinder part 40b1 and a flange part 40b2. The cylinder part 40b1 is positioned inside the housing 10, and the flange part 40b2 is positioned outside the housing 10. The cylinder part 40b1 has a substantially cylindrical shape surrounding a circumference of the cylinder part 40a1 of the inner race 40a, and extends in the axle direction. An outer diameter of the cylinder part 40b1 is substantially a same as an inner diameter of the projecting part 11 of the housing 10. Therefore, the inner peripheral surface 11a of the projecting part 11 abuts against an outer peripheral surface 45 of the cylinder part 40b1. On a part of the outer peripheral surface 45 of the cylinder part 40b1 which abuts against the inner peripheral surface 11a of the projecting part 11, a groove 46 extending over a whole periphery of the cylinder part 40b1 is provided. Therefore, parts of the outer peripheral surface 45 which are positioned both sides in the axle direction of the groove 46 abuts against the inner peripheral surface 11a. In the groove 46, the O-ring 62 as a "seal member" is disposed (mentioned later).

As shown in FIG. 2, an inclined surface 48a is formed by the chamfering process over a whole periphery upon a corner part connecting a side peripheral surface 46a in the axle inward direction of the groove 46 and the outer peripheral surface 45 of the cylinder part 40b1. Similarly, an inclined surface 48b is formed by the chamfering process over a whole periphery upon a corner part connecting a side peripheral surface 46b in the axle outward direction of the groove 46 and the outer peripheral surface 45 of the cylinder part 40b1. By forming the inclined surfaces 48a, 48b, it is prevented that the corner parts connecting the side peripheral surfaces 46a, 46b and the outer peripheral surface 45 damage the O-ring 62. In the present embodiment, the inclined surfaces 48a, 48b are both inclined at 45° to the outer peripheral surface 45.

In addition, an inclined surface 48c is formed by the chamfering process upon a corner part connecting the outer peripheral surface 45 of the cylinder part 40b1 and a front end surface 47 in the axle inward direction of the cylinder part 40b1. By forming the inclined surface 48c, it is prevented that the corner part connecting the outer peripheral surface 45 and the front end surface 47 damages each member inside the housing 10. In the present embodiment, the inclined surface 48c is inclined at 45° to the outer peripheral surface 45.

The groove 46 is formed at a position apart from the front end surface 47 of the cylinder part 40b1 in the axle outward direction by a predetermined distance in order to avoid the inclined surface 48a and the inclined surface 48c from continuing (contacting or interfering) with each other due to a tolerance of the chamfering process. However, as will be described later, a length in the axle direction of the cylinder part 40b1 is designed to be relatively long since the cylinder part 40b1 is a member which cooperates with the cylinder part 40a1 of the inner race 40a to accommodate the groups of the rolling elements 40c and the oil seal member 50, both of which are disposed at an interval in the axle direction. Besides, different from the projecting part 11 of the housing 10, an inclined surface by the chamfering process is not formed in the axle outward direction of the cylinder part 40b1. Therefore, the cylinder part 40b1 is prevented from becoming long in the axle direction owing to forming the groove 46.

The flange part 40b2 of the outer race 40b is fixed to the housing wall surface 10a at an outer periphery part of the opening 12 by bolts 72, 74 as "fastening members" and a non-illustrated bolt. The aforementioned ball bearing 82 is arranged at an outer periphery side from the opening 12 than the bolt 72 in order to prevent the ball bearing 82 from interfering with the bolt 72.

Two groups of the rolling elements 40c includes a group of the rolling elements 40c1 positioned in the axle inward direction and a group of the rolling elements 40c2 positioned in the axle outward direction. The group of the rolling elements 40c1 and the group of the rolling elements 40c2 are disposed side by side in the axle direction at an interval. Each group of the rolling elements 40c1, 40c2 is comprised of a plurality of bearing balls. The plurality of bearing balls are rollably disposed at intervals in a circumferential direction in a space between the inner race 40a and the outer race 40b. In the present embodiment, a part of these two groups of the rolling elements 40c is positioned inside the housing 10. The retainer retains each of the bearing balls so that the bearing balls do not come into contact with each other in the circumferential direction and the axial direction.

Next, a description about the hub part 44 will be made. The flange part 40a2 of the inner race 40a which constitutes the hub part 44 has a plane part on a plane perpendicular to an axis of the output shaft 36 (that is, a plane expanding in a radial direction). The flange part 40a2 is integrally connected to one end in the axle outward direction of the cylinder part 40a1. That is, the hub part 44 is positioned outside the housing 10. The output shaft 36 is inserted in a center of the flange part 40a2. The flange part 40a2 is fixed to (or integrated with) the output shaft 36, and integrally rotates with the output shaft 36 as well as the cylinder part 40a1 of the inner race 40a. A brake rotor 90 disposed outside the housing 10 and the wheel (illustration omitted) are fixed to the flange part 40a2 by a hub bolt (illustration omitted).

As is obvious from the description above, a part of the bearing part 42 (that is, a part of the cylinder part 40a1 of the inner race 40a, the cylinder part 40b1 of the outer race 40b, a part of the groups of the rolling elements 40c, and so on) is positioned inside the housing 10. Hereinafter, a part of the bearing part 42 positioned inside the housing 10 is called an "inside-the-housing bearing part 42".

In addition, as is obvious from FIG. 1, there is no bearing supporting the output shaft 36 disposed between the driven gear 34 and the hub bearing 40. Therefore, the hub bearing 40 plays a role of "rotatably supporting the output shaft 36 with respect to the housing 10" in addition to a usual role of "allowing rotation of the wheel while supporting a vehicle weight". Further, in the present embodiment, the output shaft 36 does not extend to the axle inward direction side of the driven gear 34. Therefore, there is no bearing supporting the output shaft 36 disposed at the axle inward direction side of the driven gear 34. That is, the present embodiment adopts a cantilever structure where the output shaft 36 is supported only by the hub bearing 40.

The oil seal member 50 is disposed inside the inside-the-housing bearing part 42. The oil seal member 50 includes a metal ring (illustration omitted), a synthetic rubber, and a coil spring, and is used for sealing between two members relatively moving with each other. A structure of the oil seal member 50 is known, and thus a detailed description about the structure will be omitted. The oil seal member 50 fluid-tightly seals a gap between the inner race 40a and the outer race 40b at a position positioned at the axle inward direction side of the group of the rolling elements 40c1. Specifically, a lip part (illustration omitted) positioned at an inner peripheral side of the oil seal member 50 is in slidably contact with the inner race 40a, and a fit part (illustration omitted) positioned at an outer peripheral side is fixed to the outer race 40b. It should be noted that the lip part and the fit part may be provided at opposite sides with each other. In this case, the lip part is in slidably contact with the outer race 40b, and the fit part is fixed to the inner race 40a.

The oil seal member 50 divides an inside of the housing 10 into two spaces, that is, a space 51 and a space S2. The space S2 is a space with a substantially cylindrical shape surrounded by the inner race 40a, the outer race 40b, the oil seal member 50, and the virtual plane. The space 51 is a space where the space S2 is removed from the inside of the housing 10. That is, inside the space 51, the motor 20, the ball bearings 80, 82, the driving gear 32, the driven gear 34, a part of the output shaft 36, and the oil supply apparatus 70 are disposed. A lubricating oil circulates inside the space 51, and a grease with a higher viscosity than the lubricating oil is filled inside the space S2 (mentioned later).

The oil seal member 52 is disposed at an axle outward direction side of the group of the rolling elements 40c2. The oil seal member 52 fluid-tightly seals a gap between the inner race 40a and the outer race 40b on the outside of the housing 10. It should be noted that a bearing seal may be used in place of the oil seal member 52.

A space surrounded by the inner race 40a, the outer race 40b, the oil seal member 50, and the oil seal member 52 is defined as a space S3 for convenience sake. The grease is filled inside the space S3. Thereby, the bearing balls constituting each group of the rolling elements 40c1, 40c2 are lubricated to rotate smoothly. The grease has a higher viscosity than the lubricating oil. Besides, the oil seal members 50 and 52 are provided. Therefore, a possibility that the grease inside the space S3 leaks to the outside (that is, the outside of the space S1 and the housing 10) is extremely low.

As mentioned earlier, the space S3 includes the space S2 since the oil seal member 52 is disposed outside the housing 10. That is, the grease is filled also inside the space S2. It should be noted that the oil seal member 52 may be disposed inside the housing 10. In this case, the space S2 comes to include the space S3.

As described earlier, the o-ring 60 is disposed in the groove 41 provided on the inner peripheral surface of the cylinder part 40a1 of the inner race 40a. The O-ring 60 fluid-tightly seals a gap between the cylinder part 40a1 and the output shaft 36. The O-ring 62 is disposed in the groove 46 provided on the outer peripheral surface 45 of the cylinder part 40b1 of the outer race 40b. The O-ring 62 fluid-tightly seals a gap between the cylinder part 40b1 and the projecting part 11 of the housing 10.

The oil supply apparatus 70 is disposed inside the space S1, and comprises a reservoir (illustration omitted), a pump, and a supply pipe (for example, refer to Japanese Patent Application Laid-Open (kokai) No. 2015-107709.). In the reservoir, the lubricating oil is stored. The pump draws the lubricating oil by the motor 20 rotating in the positively rotating direction. The lubricating oil drawn is supplied, through the supply pipe, to the motor 20, the driving gear 32, the driven gear 34, and the ball bearings 80, 82. Thereby, the motor 20 is cooled as well as the driving gear 32, the driven gear 34, and the ball bearings 80, 82 are lubricated. The oil supply apparatus 70 is configured such that the lubricating oil after the cooling and the lubricating is brought back again to the reservoir. The lubricating oil circulates inside the space S1 by the oil supply apparatus 70. The oil seal member 50 can reduce a possibility that the lubricating oil inside the space S1 enters the space S2. Besides, the o-rings 60, 62 can reduce a possibility that the lubricating oil inside the space S1 leaks to the outside of the housing 10.

Next a description about an operation of the motor unit 1 will be made. When the stator 22 is supplied with electric power, torque is applied on the rotor 24, and the rotor 24 rotates. When the rotor 24 rotates, the driving gear 32 integrally rotates with the rotor 24 via the driving shaft 26. When the driving gear 32 rotates, the driven gear 34 rotates by being meshed with the driving gear 32. When the driven gear 34 rotates, the output shaft 36 integrally rotates with the driven gear 34. The driving gear 32, the driven gear 34, and the output shaft 36 (that is, the speed reducer 30) decelerates a rotating speed of the rotor 24 to increase torque thereof. The torque increased is transmitted to the wheel fixed to the hub part 44 of the hub bearing 40, and thereby the wheel rotates.

Figure 3:
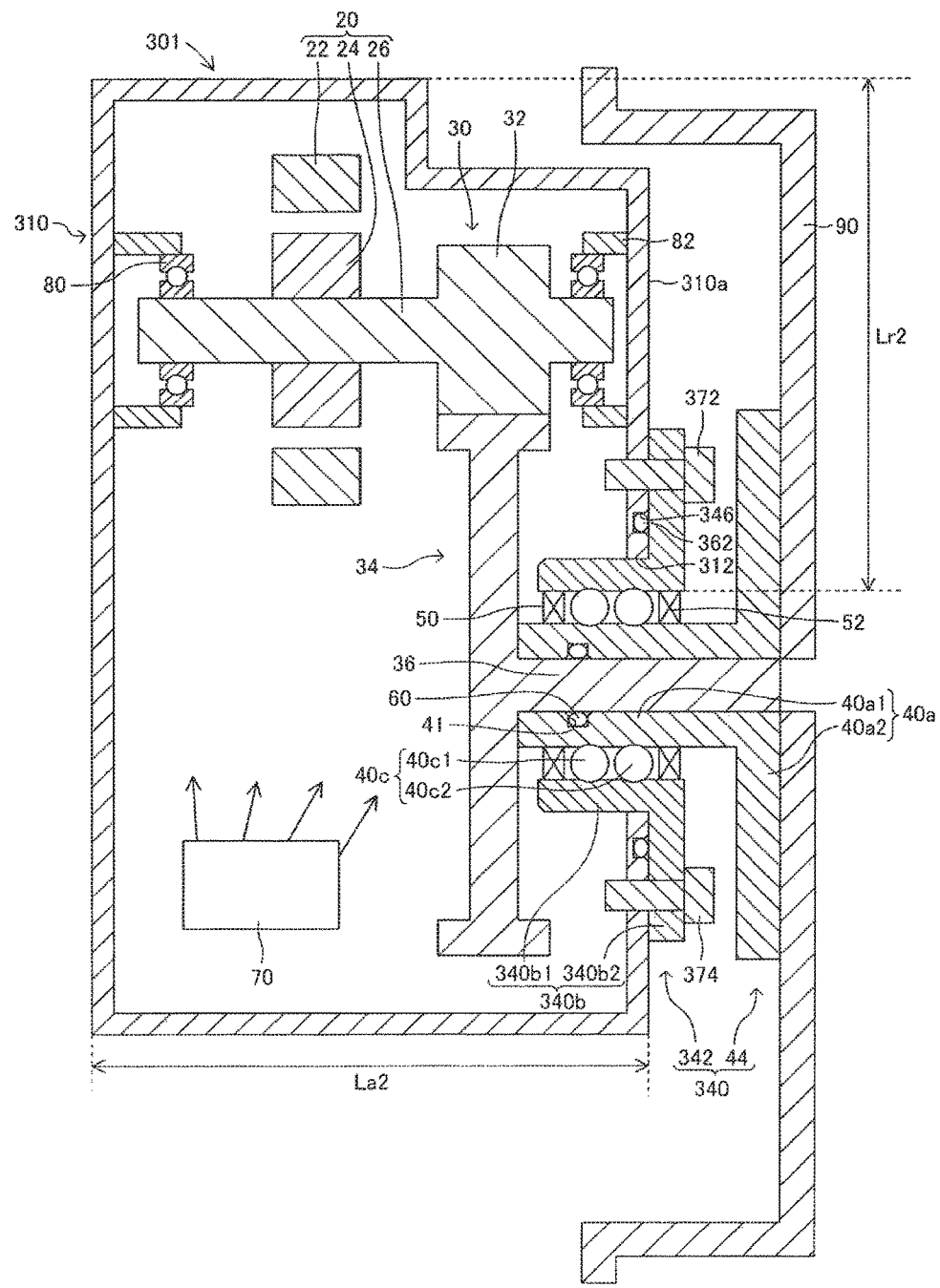
FIG. 3 is a schematic sectional diagram for an in-wheel motor unit as a comparative example where a part of a hub bearing is positioned inside a housing when seen from a front-rear direction of a vehicle.

Effects of the motor unit 1 according to the present embodiment will be described. FIG. 3 is a schematic sectional diagram for the motor unit 301 as a comparative example where a part of the hub bearing 340 (specifically, a part of a bearing part 342) is positioned inside the housing 310. In this configuration, the O-ring 362 is disposed at the outer periphery part of the housing opening 312 for fluid-tightly sealing a gap between the housing 310 and the outer race 340b. Therefore, the bolts 372, 374 for fixing the outer race 340b (strictly, the flange part 340b2 of the outer race 340b) to the housing 310 need to be disposed at the outer periphery side of the O-ring 362, and as a result, the motor unit 301 increases in size in the radial direction.

In contrast, in the motor unit 1 according to the present embodiment, the housing 10 has the projecting part 11, and the O-ring 62 for fluid-tightly sealing the gap between the housing 10 and the outer race 40b is disposed between this projecting part 11 and the cylinder part 40b1 of the outer race 40b. Therefore, it becomes unnecessary to dispose the O-ring 62 at the outer periphery part of the opening 12 of the housing 10. Therefore, in comparison to the motor unit 301 in FIG. 3, the bolts 72, 74 can be disposed at positions closer to the opening 12 of the housing 10, and as a result, the motor unit 1 can be downsized in the radial direction (Lr1 (FIG. 1)<Lr2 (FIG. 3)).

Figure 4:
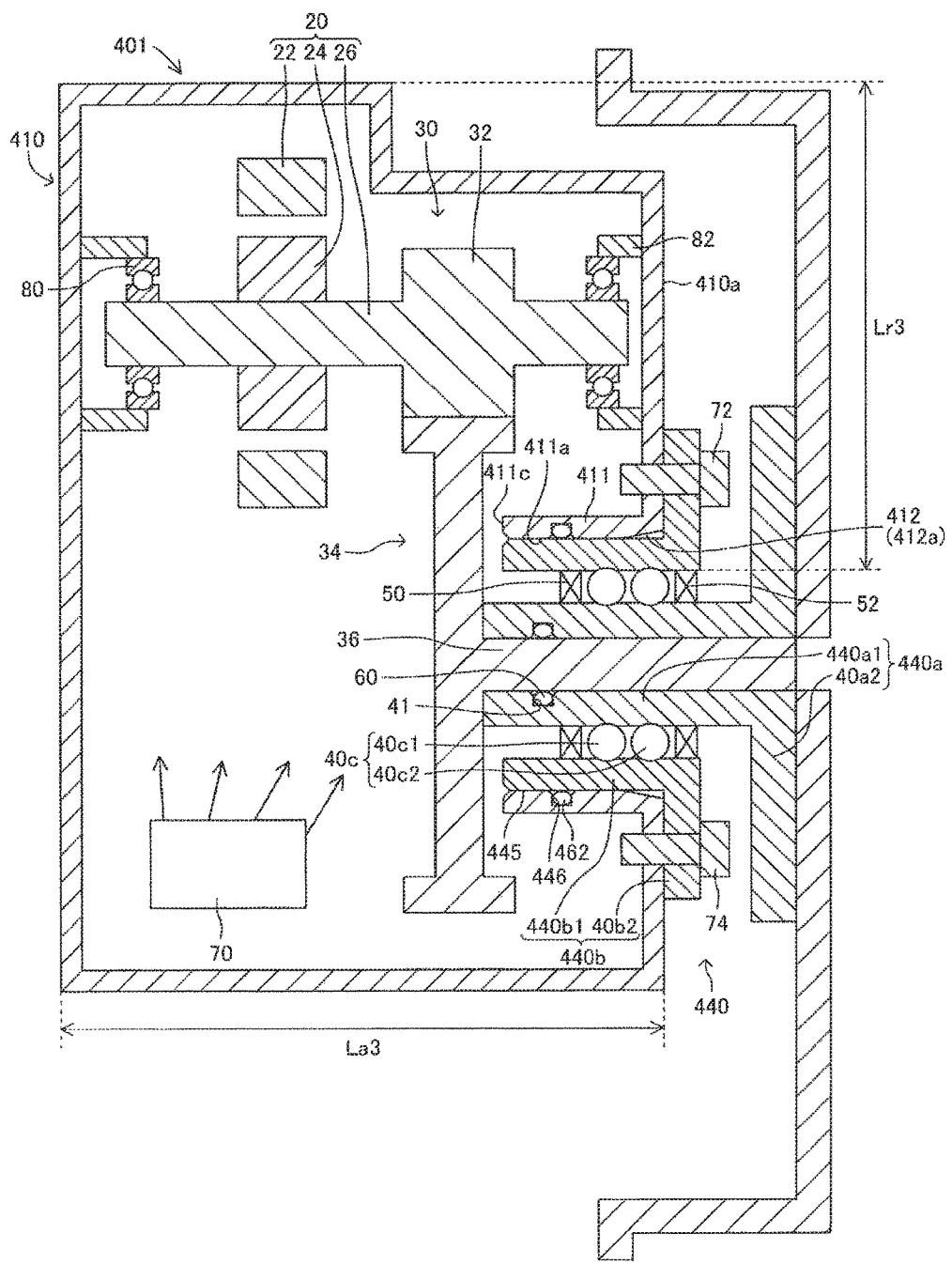
FIG. 4 is a schematic sectional diagram for one example of a configuration where the in-wheel motor unit in FIG. 3 can be downsized in a radial direction when seen from a front-rear direction of a vehicle.

In addition, in the motor unit 1 according to the present embodiment, the groove 46 for disposing the O-ring 62 is provided on the outer peripheral surface 45 of the cylinder part 40b1 of the outer race 40b, not on the inner peripheral surface 11a of the projecting part 11. Here, the motor unit 401 shown in FIG. 4 is different from the motor unit 1 in that the groove 446 for disposing the O-ring 462 (that is, a seal member for fluid-tightly sealing the gap between the housing 410 and the outer race 440b of the hub bearing 440) is provided on the inner peripheral surface 411a of the projecting part 411, not on the outer peripheral surface 445 of the cylinder part 440b1 of the outer race 440b. According to the configuration of the motor unit 401 as well, it becomes unnecessary to dispose the O-ring 462 at an outer periphery part of an opening 412 of the housing 410, and therefore the motor unit 401 can be downsized in the radial direction (Lr3 (FIG. 4)<Lr2 (FIG. 3)).

Figure 5:
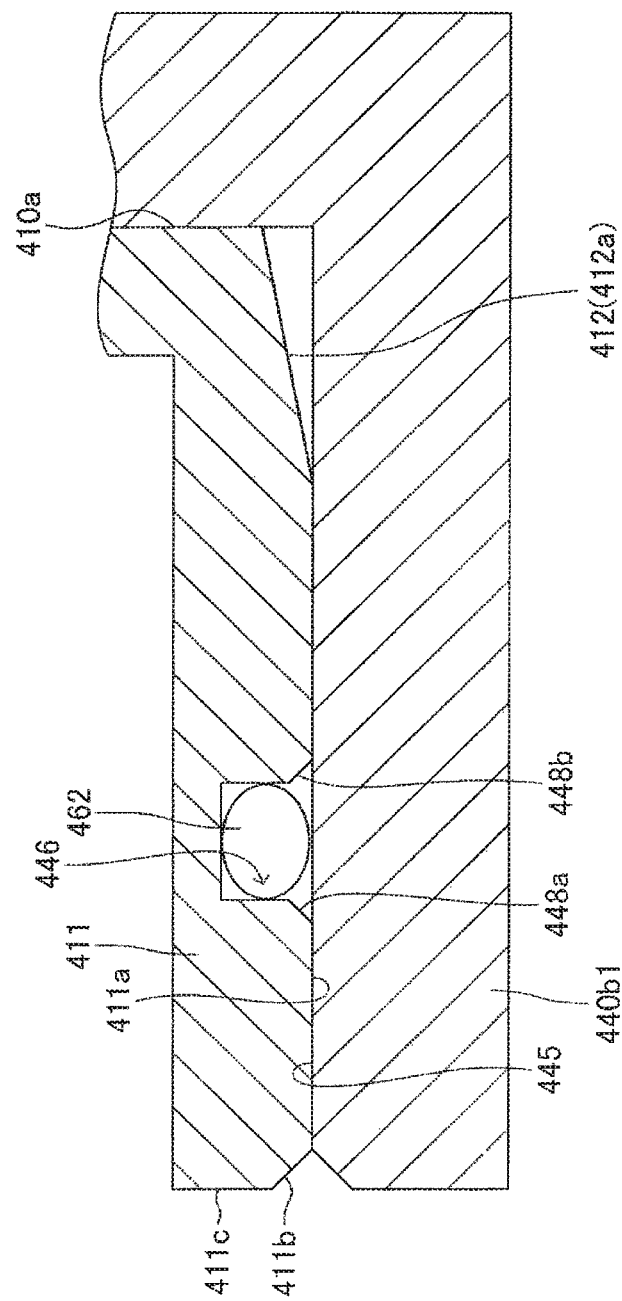
FIG. 5 is a partially enlarged diagram for a projecting part of a housing in FIG. 4 and an outer race of a hub bearing positioned inside the housing.

However, in a configuration where the groove 446 is formed on the inner peripheral surface 411 of the projecting part 411 as illustrated in the motor unit 401, a length in the axle direction of the inner peripheral surface 411a connecting the adjacent inclined surfaces (that is, the inclined surfaces 411b and 448a, and the inclined surfaces 412a and 448b) is designed to be relatively long as shown in FIG. 4 and FIG. 5 in order to avoid the adjacent inclined surfaces from continuing (contacting or interfering) with each other due to a tolerance of the chamfering process. As a result, the projecting part 411 becomes long in the axle direction, causing a cylinder part 440a1 of an inner race 440a and the cylinder part 440b1 of the outer race 440b to become long in the axle direction, and therefore the motor unit 401 is likely to increase in size in the axle direction (La3 (FIG. 4)>La2 (FIG. 3)).

In contrast, in the motor unit 1 according to the present embodiment, the groove 46 is provided on the outer peripheral surface 45 of the cylinder part 40b1 of the outer race 40b as described above. Therefore, as shown in FIG. 2, there are only two inclined surfaces (that is, the inclined surface 11b in the axle inward direction and the inclined surface 12a in the axle outward direction) formed upon the projecting part 11 by the chamfering process. Hence, a length in the axle direction of the projecting part 11 can be designed to satisfy following two points. That is, The adjacent inclined surfaces 11b and 12a are formed so as not to continue (contact or interfere) with each other due to a tolerance by the chamfering process.

The inner peripheral surface 11a has a length for abutting against parts of the outer peripheral surface 45, the parts being positioned at both sides in the axle direction of the groove 46.

According to the above configuration, it can be suppressed that the projecting part 11 becomes long in the axle direction in comparison to the motor unit 401 in FIG. 4.

In addition, as shown in FIG. 2, in the motor unit 1, the inclined surface 48c is formed on the corner part in the axle inward direction of the cylinder part 40b1 (that is, the corner part connecting the outer peripheral surface 45 of the cylinder part 40b1 and the front end surface 47). Therefore, the groove 46 is formed at a position apart from the front end surface 47 of the cylinder part 40b1 in the axle outward direction by a predetermined distance in order to avoid the inclined surfaces 48a and 48c from continuing (contacting or interfering) with each other due to a tolerance of the chamfering process. However, the length in the axle direction of the cylinder part 40b1 is designed to be relatively long since the cylinder part 40b1 is a member which cooperates with the cylinder part 40a1 of the inner race 40a to accommodate the groups of the rolling elements 40c and the oil seal member 50, both of which are disposed at an interval in the axle direction. Further, different from the projecting part 11, an inclined surface by the chamfering process is not formed in the axle outward direction of the cylinder part 40b1. Therefore, the cylinder part 40b1 is prevented from becoming long in the axle direction owing to forming the groove 46.

From the above, according to the motor unit 1 of the present embodiment, it can be suppressed that the projecting part 11 and the cylinder part 40b1 become long in the axle direction, and therefore it can be suppressed that the motor unit 1 increases in size in the axle direction (La1 (FIG. 1) La2 (FIG. 3)<La3 (FIG. 4)).

As a result, according to the motor unit 1 of the present embodiment, it can be realized to downsize the motor unit 1 in the radial direction while suppressing an increase in size of the motor unit 1 in the axle direction.

Further, in the motor unit 301 shown in FIG. 3 as the comparative example, in a case when the outer race 340b is assembled to the housing 310, the cylinder part 340b1 of the outer race 340b is inserted from the outside of the housing 310 via the opening 312 in the axle inward direction and the flange part 340b2 of the outer race 340b is fixed to the housing wall surface 310a by the bolts 372 and 374 with the O-ring 362 put into a groove 346 provided at the outer periphery part of the housing opening 312. This assembly method assures a high reliability of assembling since a possibility that the O-ring 362 comes off the groove 346 is low.

On the other hand, in the motor unit 401 shown in FIG. 4, the groove 446 is formed on the inner peripheral surface 411a of the projecting part 411 and therefore the cylinder part 40b1 is inserted from the outside of the housing 410 with the O-ring 462 put into the groove 446. In this case, if the O-ring 462 comes off the groove 446, the O-ring 462 is pushed toward the axle inward direction by the cylinder part 40b1, and therefore it is difficult for an operator or a machine performing an assembling operation on the outside of the housing 410 to visually recognize or detect the O-ring 462 which came off, which may lower a reliability of assembling.

In contrast, in the motor unit 1 according to the present embodiment, the groove 46 is formed on the outer peripheral surface 45 of the cylinder part 40b1 of the outer race 40b and therefore the cylinder part 40b1 is inserted from the outside of the housing 10 with the O-ring 62 put into the groove 46. In this case, if the O-ring 62 comes off the groove 46, the O-ring 62 is pushed toward the axle outward direction as the cylinder part 40b1 is inserted toward the axle inward direction. Therefore, in a case when an operator performs an assembling operation, the operator can visually recognize the come off O-ring 62 from a gap between the flange part 40b2 of the outer race 40b and the housing wall surface 10a, and in a case when a machine performs the assembling operation, a sensor of the machine can easily detect the O-ring 62 which came off.

In addition, since a gap between the cylinder part 40b1 and the projecting part 11 is extremely narrow, if at least a part of the O-ring 62 drops from the groove 46, it may be also considered that the whole O-ring 62 comes off the groove 46 to be pushed toward the axle outward direction, resulting in moving to a gap between the flange part 40b2 of the outer race 40b and the housing wall surface 10a. In this case as well, the operator or the machine can visually recognize or detect that the O-ring 62 has come off the groove 46 easily.

Therefore, according to the motor unit 1 of the present embodiment, it becomes possible to visually recognize or detect the come-off of the O-ring 62 properly, and therefore a decrease in reliability of assembling the outer race 40b to the housing 10 can be suppressed in comparison to the motor unit shown in FIG. 4.

Further, in the motor unit 1 according to the present embodiment, a part of the output shaft 36 positioned at the axle outward direction side of the driven gear 34 is rotatably supported with respect to the housing 10 only by the bearing part 42 of the hub bearing 40. That is, in the motor unit 1, the hub bearing 40 plays a role of "rotatably supporting the output shaft 36 with respect to the housing 10". Therefore, in the motor unit 1, a ball bearing for rotatably supporting a part of the output shaft positioned at the axle outward direction side of the driven gear with respect to the housing 10 becomes unnecessary. Hence, the motor unit 1 can be further downsized/miniaturized in the axle direction by a length of this unnecessary bearing, and a number of parts can be reduced as a whole.

Further, the motor unit 1 adopts the cantilever structure where the output shaft 36 is supported only at one side of the driven gear 34. The bearing part 42 has a cylindrical shape by two groups of the rolling elements 40c1, 40c2 being disposed side by side in the axle direction. Therefore, a contact area (a length in the axial direction) in which the inner race 40a is in contact with the output shaft 36 is larger than a contact area of a general bearing (that is, a bearing having only one group of the rolling elements). Therefore, even when the cantilever structure is adopted, the hub bearing 40 can stably support the output shaft 36, and rattling of the output shaft 36 can be suppressed. As a result, it becomes possible to suppress noise and vibration generated due to the rattling of the output shaft 36. Besides, according to this configuration, a number of bearings supporting the output shaft 36 can be reduced in comparison to the both-ends-supported structure (that is, a structure where the output shaft penetrates the driven gear to extend to the axle inward direction side of the driven gear). Therefore, the motor unit 1 can be further downsized in the axle direction by a length of the bearing reduced in number, and a number of parts can be reduced as a whole.

The in-wheel motor units according to the embodiments have been described. However, the present invention is not limited to the aforementioned embodiments and may adopt various modifications within a scope of the present invention.

For example, a ball bearing for rotatably supporting the output shaft 36 positioned at the axle outward direction side of the driven gear 34 with respect to the housing 10 may be arranged inside the housing 10. In addition, a both-ends-supported structure may be adopted.

In the above embodiment, the inclined surfaces 11b, 12a are formed on the projecting part 11 of the housing 10, and the inclined surface 48c is formed on the cylinder part 40b1 of the outer race 40b of the hub bearing 40 by the chamfering process. However, these inclined surfaces 11b, 12a, and 48c may not be formed.

In addition, angles of the inclined surfaces formed by the chamfering process are not limited to the values in the above embodiment.

In addition, more than or equal to three groups of the rolling elements 40c may be disposed side by side. In addition, rollers may be selected as a type of the rolling elements constituting the groups of the rolling elements 40c.

In the aforementioned embodiment, the cylinder part 40a1 of the inner race 40a of the hub bearing 40 is a different member from the output shaft 36. However, the cylinder part 40a1 and the output shaft 36 may be integrated with each other. For example, the cylinder part 40a1 and the output shaft 36 may be integrated by welding or cutting/shaving-out/machining.

In the aforementioned embodiment, the speed reducer 30 only has a reducing mechanism which realizes one stage of deceleration. However, a configuration is not limited thereto. For example, the speed reducer 30 may have a reducing mechanism which realizes two stages of decelerations or more than or equal to three stages of decelerations by further including a reducing mechanism using a planetary gear. Alternatively, a reducing mechanism using a planetary gear may be used instead of the reducing mechanism of the speed reducer 30 in the aforementioned embodiment.

The invention claimed is:

1. An in-wheel motor unit comprising;
   a housing supported by a vehicle body and disposed inside a wheel of a vehicle;
   a motor supported by said housing and accommodated inside said housing;
   a speed reducer comprising a rotating body configured to be rotated by said motor on an inside of said housing and an output shaft fixed to or integrated with said rotating body, penetrating an opening provided on a wall surface of said housing to extend to outside of said housing in an axle outward direction, and configured to integrally rotate with said wheel;
   a hub bearing comprising an inner race fixed to a part of said output shaft positioned at an axle outward direction side of said rotating body and an outer race fixed to said housing, and rotatably supporting said output shaft with respect to said housing; and
   a seal member fluid-tightly sealing a gap between said housing and said outer race,
   wherein,
   said inner race comprises a cylinder part, a part of which being disposed inside said housing and a flange part provided at an end part in said axle outward direction of said cylinder part,
   said outer race comprises a cylinder part disposed inside said housing and a flange part provided at an end part in the axle outward direction of said cylinder part,
   said flange part of said outer race is fixed to said wall surface of said housing by one or a plurality of fastening members, and said flange part of said inner race is fixed to a brake rotor disposed outside said housing,
   said housing has a projecting part with a substantially cylindrical shape extending from said opening in an axle inward direction,
   an outer peripheral surface of said cylinder part of said outer race abuts against an inner peripheral surface of said projecting part,
   a part of said outer peripheral surface of said cylinder part of said outer race, said part abutting against said inner peripheral surface of said projecting part, includes a groove extending over a whole periphery of said cylinder part of said outer race, and
   said seal member is disposed in said groove.

2. The in-wheel motor unit according to claim 1, wherein, said part of said output shaft positioned at said axle outward direction side of said rotating body is rotatably supported with respect to said housing only by said hub bearing.

* * * * *